United States Patent [19]
Letchford et al.

[11] Patent Number: 5,919,870
[45] Date of Patent: *Jul. 6, 1999

[54] FUNCTIONAL TELECHELIC STAR POLYMERS

[75] Inventors: Robert J. Letchford, Cherryville; Conrad W. Kamienski, Gastonia; James A. Schwindeman, Lincolnton, all of N.C.

[73] Assignee: FMC Corporation, Philadelphia, Pa.

[ * ] Notice: This patent is subject to a terminal disclaimer.

[21] Appl. No.: 08/660,658

[22] Filed: Jun. 5, 1996

Related U.S. Application Data

[60] Provisional application No. 60/001,689, Jul. 31, 1995.

[51] Int. Cl.$^6$ .............................. C08F 4/08; C08F 36/04; C08F 36/06
[52] U.S. Cl. .................. 525/333.2; 525/272; 525/332.9; 525/333.3; 525/342; 526/175; 526/181
[58] Field of Search ................................ 525/333.2, 272, 525/332.9, 333.3, 342; 526/175, 181

[56] References Cited

U.S. PATENT DOCUMENTS

| | | |
|---|---|---|
| 3,280,084 | 10/1966 | Zalinski et al. . |
| 3,326,881 | 6/1967 | Uraneck et al. . |
| 3,639,517 | 2/1972 | Kitchen et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,985,830 | 10/1976 | Fetters et al. . |
| 4,039,593 | 8/1977 | Kamienski et al. . |
| 4,994,526 | 2/1991 | Peters . |
| 5,310,490 | 5/1994 | Struglinski et al. . |
| 5,310,814 | 5/1994 | Struglinski et al. . |
| 5,331,058 | 7/1994 | Shepherd et al. . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |
| 5,523,364 | 6/1996 | Engel ....................... 526/180 |
| 5,565,526 | 10/1996 | Schwindeman ........... 525/272 |
| 5,567,774 | 10/1996 | Schwindeman ........... 525/272 |
| 5,600,021 | 2/1997 | Schwindeman ........... 568/671 |
| 5,621,149 | 4/1997 | Schwindeman ........... 568/659 |
| 5,654,371 | 8/1997 | Schwindeman ........... 525/272 |
| 5,708,092 | 1/1998 | Schwindeman ........... 525/272 |

FOREIGN PATENT DOCUMENTS

| | | |
|---|---|---|
| 0 593 049 | 4/1994 | European Pat. Off. . |
| 0 632 075 | 1/1995 | European Pat. Off. . |
| 0 632 075 A2 | 1/1995 | European Pat. Off. . |
| 2144430 | 3/1985 | United Kingdom . |
| 2 241 239 | 8/1991 | United Kingdom . |
| 2 270 317 | 3/1994 | United Kingdom . |
| WO 91/12277 | 8/1991 | WIPO . |
| WO 95/22566 | 8/1995 | WIPO . |

OTHER PUBLICATIONS

Odian, G., "Principles of Polymerization", Third Edition, 427–428, Wiley (New York), 1991.
D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., *Macromolecules* 20, 2068–2076 (1987).

*Primary Examiner*—Fred Zitomer
*Attorney, Agent, or Firm*—Alston & Bird LLP

[57] ABSTRACT

Protected functional initiators have been demonstrated to polymerize dienes and alkenyl substituted aromatics. The resultant living anions were linked with a coupling agent, such as divinylbenzene or tin tetrachloride, to afford a protected functionalized star polymer. Subsequent deprotection afforded a star polymer, with functional groups on the end of each arm of the star. The star polymer could be hydrogenated before or after removal of the protecting groups. The newly liberated functional groups can participate in further polymerization chemistry.

38 Claims, No Drawings

FUNCTIONAL TELECHELIC STAR POLYMERS

This application is a continuation in part of provisional patent application 60/001,689 filed Jul. 31, 1995.

This invention concerns multi-branched functional polydiene polymers, polyarylene polymers and polydiene/polyarylene copolymers, their hydrogenated analogues, and the process to prepare these telechelic star polymers.

Multi-branched or star-shaped polymers were first described by Zelinski in U.S. Pat. No. 3,280,084, in which polybutadiene anion (generated by addition of butyllithium to butadiene) was coupled with 0.02 to 1 part by weight of divinylbenzene to 100 parts of monomer. The resultant star polymer had a polydivinylbenzene core and several identical arms of polybutadiene radiating from the core. The arms could also be either random or block copolymers of styrene and butadiene, wherein the diene is the major component. The synthesis of star polymers with arms of different molecular weights was disclosed by Kitchen et al, U.S. Pat. No. 3,639,517. Fetters and Bi, U.S. Pat. No. 3,985,830, detailed the preparation of star polymers with a nucleus of more than one molecule of divinylbenzene, and more than three arms. These polymers were formed by addition of living homopolymers and copolymers of conjugated diene monomers and block copolymers of conjugated diene monomers and monovinylaromatic monomers to divinylbenzene. These unfunctionalized star polymers have been employed as viscosity index (V.I.) improvers for lube oil compositions (see for example, U.S. Pat. Nos. 5,310,490 and 5,310,814).

Star polymers have also been prepared which contain functionality, such as hydroxy groups, at the ends of the arms. For instance, European Patent Application 0632075, disclosed the preparation of star molecules with hydroxyl groups formed at the terminus of each living arm of the star. These polymers were prepared by addition of ethylene oxide to the living anions at the ends of the arms of the star polymer. However, these functionalization reactions are often inefficient, due to the formation of physical gelation phenomena that produce severe mixing problems (see L. Weber, Makromol. Chem., Macromol. Symp., 3, 317 (1986) and U.S. Pat. Nos. 5,393,843 and 5,478,899). These functionalized star polymers were useful in making adhesives, sealants, coatings, films and fibers.

The present invention provides polymers prepared by polymerizing a conjugated diene, a mixture of conjugated diene monomers, or a mixture of one or more conjugated diene monomers together with one or more alkenylaromatic compounds, in an inert solvent, at a temperature from −30° C. to 150° C., for a period of at least one hour, with a protected functionalized initiator having the formula $$M\text{-}Q_n\text{-}Z\text{-}T\text{-}(A\text{-}R^1R^2R^3)_m \qquad (I)$$

wherein M is an alkali metal selected from lithium, sodium and potassium; Q is an unsaturated hydrocarbyl group derived by incorporation of one or more conjugated diene hydrocarbons, one or more alkenylaromatic compounds, or mixtures of one or more dienes with one or more alkenylaromatic compounds into the M-Z linkage; Z is a branched or straight chain hydrocarbon connecting group which contains 3–25 carbon atoms; T is selected from oxygen, sulfur, or nitrogen groups and mixtures thereof; $(A\text{-}R^1R^2R^3)_m$ is a protecting group in which A is an element selected from Group IVa of the Periodic Table of the Elements, and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms, n is an integer from 0 to 5, and m is 1 when T is oxygen or sulfur, and 2 when T is nitrogen, to produce protected "living" polymer anions which are reacted with di-and polyfunctional agents to produce telechelic multi-arm polymers. Removal of the protecting group (deprotection) produces polymers with oxygen, sulfur or nitrogen functional groups on the ends of the polymers. The residual aliphatic unsaturation can be optionally removed by hydrogenation before or after removal of the protecting groups. These functional groups can then participate in various copolymerization reactions by reaction of the functional groups on the ends of the arms of the polymer with polymer with a selected difunctional or polyfunctional comonomer or comonomers selected from the group consisting of organic dicarboxylic acids, organic polycarboxylic acids, organic diisocyanates, organic polyisocyanates, organic diamids, organic polyamids, organic polyols, ethylene oxide in the presence of potassium butoxide. methacrylol chloride and styrenyldimethylchlorosilane which is subsequently reacted with a free radically polymerizable monomer.

The initiators of the formulae $M\text{-}Q_n\text{-}Z\text{-}T\text{-}(A\text{-}R^1R^2R^3)_m$ (I) are prepared by reacting a compound of the formula $M\text{-}Z\text{-}T\text{-}(A\text{-}R^1R^2R^3)_m$ (II), where in M, Z, T, A, $R^1$, $R^2$, $R^3$, and m have the meanings ascribed above, with one or more conjugated diene hydrocarbons, one or more alkenylaromatic compounds, or mixtures of one or more dienes with one or more alkenylaromatic compounds, to form an extended hydrocarbon chain between M and Z in formula (II), which extended chain is denoted as $Q_n$ in formula (I). The compounds of formula(II) are prepared by first, reacting in an inert solvent, a selected tertiary amino-1-haloalkane or an omega-hydroxy-protected-1-haloalkane or an omega-thio-protected-1-haloalkane, depending on whether "T" is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula II) which is then optionally reacted with a one or more conjugated diene hydrocarbons, one or more alkenylaromatic compounds, or mixtures of one or more dienes with one or more alkenylaromatic compounds, in a predominantly alkane, cycloalkane, or aromatic reaction solvent, which solvent contains 5 to 10 carbon atoms, and mixtures of such solvents to produce a monofunctional initiator with an extended chain or tether between the metal atom (M) and element (T) in formula (I) above and mixtures thereof with compounds of Formula (II). Q in formula (I) is preferably derived from conjugated 1,3-dienes. While "A" in the protecting group $(AR^1R^2R^3)$ of the formulae above can be any of the elements in Group IVa of the Periodic Table of the Elements, carbon and silicon initially appear the most useful, especially when polymerizing conjugated dienes.

Incorporation of Q groups into the M-Z linkage to form the compounds of formula (I) above involves addition of compounds of the formula $$M\text{-}Z\text{-}T\text{-}(A\text{-}R^1R^2R^3)_m, \qquad (II)$$

where the symbols have the meanings ascribed above, across the carbon to carbon double bonds in compounds selected from the consisting of one or more conjugated diene hydrocarbons, one or more alkenylaromatic compounds, or mixtures of one or more dienes with one or more alkenylaromatic compounds to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M-Z (M=Li) bonds, themselves.

The tertiary amino-1-haloalkanes useful in practicing this invention are compounds of the following general structures:

 (III)

and

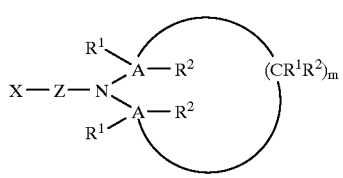 (IV)

wherein X is defined as a halogen, preferably chlorine or bromine; Z is defined as a branched or straight chain hydrocarbon tether or connecting group which contains 3–25 carbon atoms, which tether may also contain aryl or substituted aryl groups; A is an element selected from Group IVa of the Periodic Table of the Elements and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and m is an integer from 1 to 7, and their employment as initiators in the anionic polymerization of olefin containing monomers in an inert, hydrocarbon solvent optionally containing a Lewis base. The process reacts selected tertiary amino-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the tertiary amine initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation and is finally terminated with appropriate reagents so that the polymer is monofunctionally or di-functionally terminated. The polymers may have a molecular weight range of about 1000 to 10,000 but the molecular weight can be higher. Typically 5 to 50 milli-moles of initiator is used per mole of monomer.

Tertiary amino-1-haloalkanes useful in the practice of this invention include but are not limited to 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is selected from chlorine and bromine.

Omega-hydroxy-protected-1-haloalkanes, useful in producing monofunctional ether initiators useful in practicing this invention, have the following general structure:

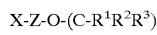 (V)

wherein X is defined as a halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional ether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation and is finally terminated with appropriate reagents so that the polymer is monofunctionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S.

Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate is employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accord with this earlier process useful in practicing this invention can include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-diemthyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino)-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

$$X-Z-O-(Si-R^1R^2R^3) \qquad \text{(VI)}$$

wherein X is defined as a halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane or cycloalkane reaction solvent containing 5 to 10 carbon atoms and mixtures of such solvents.

Anionic polymerizations employing the monofunctional siloxy ether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Omega-silyl-protected-1-haloalkanes prepared in accord with this earlier process useful in practicing this invention can include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylsilyloxy)-1-propyl halide, 3-(t-butyldiphenylsilyloxy)-2-methyl-1-propyl halide, 3-(t-butyldiphenylsilyloxy)-2,2-dimethyl-1-propyl halide, 4-(t-butyldiphenylsilyloxy)-1-butyl halide, 6-(t-butyldiphenylsilyloxy)-1-hexyl halide and 3-(trimethylsilyloxy)-2,2-dimethyl-1-propyl halide. The halo- or halide group is selected from chlorine and bromine.

Monofunctional thioether initiators useful in the practice of this invention are derived from omega-thio-protected-1-haloalkanes of the following general structure:

$$X-Z-S-(A-R^1R^2R^3) \qquad \text{(VII)}$$

wherein X is defined as a halogen, preferably chlorine or bromine; Z is a branched or straight chain hydrocarbon group which contains 3–25 carbon atoms, optionally containing aryl or substituted aryl groups; $(A-R^1R^2R^3)$ is a protecting group in which A is an element selected from Group IVa of the Periodic Table of the Elements, and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thioether initiators are conducted in an inert solvent, preferably a non-polar solvent, optionally containing an ethereal modifier, using an olefinic monomer which is an alkenylaromatic or a 1,3-diene at a temperature of about −30° C. to about +150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The initiator precursor, omega-thio-protected-1-haloalkanes (halides), are prepared from the corresponding halothiol by the standard literature methods. For example, 3-(1,1-dimethylethylthio)-1-propylchloride is synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involved the reaction of the appropriate thiol with 2-methyl-2-butene catalyzed by boron trifluoride etherate is employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, are prepared by the reaction of the omega-chloro-thiol with bromochloromethane, methanol, and potassium hydroxide, by the method of F. D. Toste and I. W. J. Still, Synlett, 1995, 159. T-Butyldimethylsilyl protected compounds, for example 4-(t-butyldimethylsilylthio)-1-butylhalide, are prepared from t-butyldimethylchlorosilane, and the corresponding thiol, according to the method described in U.S. Pat. No. 5,493,044.

Omega-thio-protected 1-haloalkanes prepared in accord with this earlier process useful in practicing this invention can include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is selected from chlorine and bromine.

The olefinic monomer to be anionically polymerized is preferably an alkenylaromatic or a 1,3-diene. Examples of conjugated diene hydrocarbons useful in practicing this invention include, but are not limited to: 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Examples of polymerizable alkenyl substituted aromatic compounds which can be anionically polymerized in accord with this invention include, but are not limited to: styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include; 3-methylstyrene, 3,5-diethylstyrene, 2-ethyl-4-benzylstyrene, 4-phenylstyrene, 4-p-tolylstyrene, 4-(tert-butyl)styrene, 2,4-divinyltoluene and 4,5-dimethyl-1-vinylnaphthalene. Reference is made to U.S. Pat. No. 3,377,404 for disclosures of additional alkenyl substituted aromatic compounds.

Different ways of conducting the polymerization to produce the protected "living" polymer anions include polymerization of one or more conjugated diene hydrocarbons, one or more alkenylaromatic compounds, or mixtures of one or more dienes with one or more alkenylaromatic compounds, which can be polymerized together, sequentionally and in different lots and then mixed. It is thus possible to couple these anions with coupling agents to produce multi-branched star polymers which can have branches of differing chain lengths.

The reaction medium is generally an inert solvent, typically a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents such as alkanes and cycloalkanes containing five to ten carbon atoms such as pentane, hexane, cyclohexane, methylcyclohexane, heptane, methylcycloheptane, octane, decane and so forth and aromatic solvents containing six to ten carbon atoms such as toluene, ethylbenzene, p-xylene, m-xylene, o-xylene, n-propylbenzene, isopropylbenzene, n-butylbenzene, and the like.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to: diethyl ether, dibutyl ether, tetrahydrofuran, 2-methyltetrahydrofuran, methyl tert-butyl ether, diazabicyclo[2.2.2]octane, triethylamine, tributylamine, tetramethylethylene diamine (TMEDA), and 1,2-dimethoxyethane (glyme). The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

Difunctional and poly functional compounds (coupling agents) useful in the practice of this invention include but are not limited to chlorosilanes as exemplified by silicon tetrachloride and methyl trichlorosilane, and chlorostannanes as exemplified by tin tetrachloride and butyltin trichloride, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, 1,3,5-trivinylnaphthalene, and other materials known in the art to be useful for coupling of polymers. See for example, U.S. Pat. No. 5,489,649 for additional coupling agents. Of course, mixtures of the coupling agents may also be employed. The amount of coupling agent added is such that the molar ratio of protected living polymer anions to coupling agent is in the range of 1 to 24.

After reaction of the protected living polymer anion with the polyfunctional coupling agents, the reaction may be terminated by the addition of a proton donor, such as methanol, isopropanol, or acetic acid. The resultant multi-arm polymer may then be isolated by conventional means. For example, the reaction mixture may be poured into a precipitant, such as isopropanol to precipitate the polymer, followed by filtration and drying of the poylmer. Alternatively, after termination, the solvent may be removed, to afford the protected multi-arm polymer.

The protected hydroxy multi-arm star polymers of this invention alone and in their hydrogenated forms, could be used as base materials to lend flexibility and higher impact strength in a number of formulas to produce coatings, sealants, binders and block copolymers with polyesters, polyamides and polycarbonates as described in UK Patent Application GB2)70317A and in "Polytail" data sheets and brochures (Mitsubishi Kasei America).

Thus, in the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

Thus, for example, hydrogenated multi-arm polymers may be reacted with bisphenol A and phosgene in the presence of appropriate catalysts with simultaneous deprotection to yield a polycarbonate alternating block copolymer. The resulting products are useful as molding resins, for example, to prepare interior components for automobiles.

A segmented polyamide-hydrogenated block copolymer is also useful as a molding composition to prepare exterior automotive components that can be prepared by reacting hydrogenated multi-arm polymer with caprolactam and adipic acid in the presence of a suitable catalyst.

A segmented polyester-hydrogenated multi-arm block copolymer is produced by reaction of hydrogenated multi-arm polymer with dimethyl terephthalate and a suitable acidic catalyst. Again, the products are useful as molding compounds for exterior automotive components.

Isocyanate-terminated prepolymers can be produced from hydrogenated multi-arm polymers by reaction with suitable diisocyanates (2/1 NCO/OH) as above and which can be further reacted with diols and additional diisocyanates to form segmented polyurethanes useful for water based, low VOC coatings. Inclusion of acid functional diols such as dimethylolpropionic acid in the polyurethane introduces pendant carboxyl groups which can be neutralized with tertiary amines to afford water dispersable polyolefin/polyurethane segmented stars for water based coatings. This same principle could be applied to acrylic polymers made with tertiary amine functional monomers included, which could be made by free radical polymerization following reacting the hydroxyl groups at the terminal ends of the star with acryloyl chloride or methacryloyl chloride. Or segmented polyurethane prepolymers may be mixed with tackifying resins and used as a moisture-curable sealant, caulk or coating.

Another possible application in coatings would be the use of new dendrimers, based on the use of the polyolefin or polydiene polymer star with the hydroxyl functionality at the termini of star arms to form the core for dendritic hybrid macromolecules based on condensation or addition polymerizations utilizing the hydroxyl functionality as the initiating site (see, for example Gitsov and Frechet, American Chemical Society PMSE Preprints, Volume 73, August 1995.

Yet another application would be for new toughening polymers for epoxy composites, utilizing the elastomer diene core with the hydroxyl groups converted to half esters by reaction with anhydrides. These epoxy reactive stars can then be utilized as reactants with epoxy resins and amines in such composite systems. Reacting the hydroxyl functional stars into unsaturated polyesters provides a new polymer toughening system for polyester molding compounds for automotive and other uses. For a review of the use of linear polymers for toughening of epoxies and polyesters, see "Rubber-Toughened Plastics", Edited By C. Keith Riew, ACS Advances in Chemistry Series, #222.

Cathodic electrodepositable coatings may be prepared from the epoxy functional stars described above by reacting with epoxy resins in the presence of excess amine or polyamine, to completely react all the epoxy groups, distilling off the excess amine, and neutralizing the resulting epoxy-amine adduct with water soluble organic or inorganic acids to form water soluble, quarternary ammonium containing polymer salts (see for reference, U.S. Pat. Nos. 3,617,458, 3,619,398, 3,682,814, 3,891,527, 3,947,348, and 4,093,594). Alternatively, the above epoxy-amine polymer star adducts may be converted to quarternary phosphonium or sulfonium ion containing polymers as in U.S. Pat. No. 3,935,087.

An acrylate-terminated prepolymer curable by free-radical processes can be prepared from the hydrogenated multi-arm polymer by reaction with a diisocyanate (2NCO/OH) followed by further reaction with hydroxyethyl acrylate in the presence of a basic reagent.

VISCOSITY INDEX (V.I.). Improvers for lubricating oils is another likely application for this acrylate or methacrylate terminated polymer, where by using carboxyl functional monomers such as acrylic acid and methacrylic acid and/or amine functional monomers such as acrylamide along with free radical initiators in further polymerizations, the result is formation of polymer segments at the periphery of each star arm with amine or other functionalities which, in addition to the advantageous properties of the star polymers for V.I. Improvers, combines the ability to add functionality to the arms for dispersant properties (see for example, U.S. Pat. Nos. 5,496,898, 4,575,530, 4,486,573, 5,290,874, and 5,290,868). For example, as in U.S. Pat. No. 4,575,530, monomers such as 4-vinyl pyridine and sulfonated styrene may be polymerized alone or copolymerized with other acrylic monomers by free radical initiators onto terminal alkenyl groups, formed by reaction of the hydroxyl groups at the terminal ends of the star arms with methacroyl chloride or acryloyl chloride.

The versatility of the hydroxyl functional stars of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

Alternatively, the protecting groups may be removed, either before or after hydrogenation of the aliphatic unsaturation, then the hydroxy terminated multi-arm polymer may be reacted with functional comonomers, to produce novel copolymers. Thus, for example, the hydroxy terminated polymer may be hydrogenated, and then reacted with ethylene oxide in the presence of potassium tert-butoxide to produce a poly(ethleneoxide)-hydrogenated star block copolymer. This reaction sequence affords a hydrogel.

In another possible application, the deprotected polymer may be reacted with an alkenylarylhalosilane such as styrenyldimethylchlorosilane to yield the corresponding omega-styrenylterminated macromonomer according to directions in U.S. Pat. No. 5,278,244 which may then be further polymerized by a variety of techniques to yield "comb" polymers which, on deprotection and hydrogenation yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another possible application, the hydrogenated hydroxyterminated branches of the star polymer may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels. Further, the acrylate or methacrylate-terminated multi-arm polymer may be polymerized by free-radical processes.

The terminal hydroxyl groups on the star arms may be converted to sulfonyl functionality by reaction with a sulfonyl chloride and then further reacted with primary amines or ammonia to form amine terminated star polymers analogous to similar functionalization of linear telechelic polymers by Hinney and Baghdadchi in European Patent 206,714.

In contrast to star polymers of the prior art, the molecular architecture of compounds of the present invention can be precisely controlled. Each arm of the multi-arm polymer contains a protected functional group. The nature of the functional group, and its protecting group can be varied, simply by changing the initiator. Further, the monomer identity, the monomer composition and molecular weight of the functional arms can be independently manipulated by varying the monomer charged to the initiator. Finally, the number of polymer arms can be adjusted by varying the nature of the coupling agent, and the ratio of living polymer to the coupling agent.

Examples of protected functionalized intiators that may be employed in this invention include, but are not limited to: 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 4-(hexamethyleneimino)-1-butyllithium, 5-(hexamethyleneimino)-1-pentyllithium, 6-(hexamethylene-imino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium 6-(t-butyldimethylsilylthio)-1-hexyllithium, and 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1- dimethylpropylthio)-1-pentyllithium, 6-(1,1-dimethylpropylthio)-1-hexyllithium, and 8-(1,1-dimethylpropylthio)-1-octyllithium. Of course, any of these initiators can be "chain extended" to increase hydrocarbon solubility prior to the polymerization reaction. In the chain extension process, the initiator is reacted with a limited amount (1–5 equivalents) of various conjugated diene hydrocarbons, such as butadiene or isoprene, or alkenyl substituted aromatics, such as styrene or alpha-methylstyrene.

If desired, the protecting groups can be removed from the polymer. This deprotection can be performed either prior to or after the optional hydrogenation of the residual aliphatic unsaturation. For example, to remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed by reaction of the star polymer with trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41. The tert-butyldimethylsilyl protecting groups can be removed by treatment of the star polymer cement with acid, such as hydrochloric acid, acetic acid, paratoluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

Examples of methods to hydrogenate the polymers of this invention are described in U.S. Pat. Nos. 4,970,254, 5,166,277, 5,393,843 and 5,496,898. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nucluer Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

The following examples further illustrate the invention.

PREPARATION OF THE INITIATORS

EXAMPLE A

Preparation of 3-(t-Butyldimethylsilyloxy)-1-propyllithium Chain Extended with 2 Moles of Isoprene Lot 8983 (461–68)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloro-propane, 58.82 grams (0.268 mole, 1.00 equivalent) was added dropwise. An exotherm was detected after 31.8% of the feed had been added. A dry ice/hexane cooling bath was applied to maintain the reaction temperature at 60–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams.

Total base=17.1 wt. %.

Active C—Li=15.9 wt %.

Yield (based on active C—Li)=80.8%.

EXAMPLE B

Preparation of 3-(t-Butyldimethylsilylthio)-1-propyllithium Chain Extended with 2 Moles of Isoprene Lot 12083 (761–68)

HYPOTHETICAL

A 500 ml, three-necked Morton flask is equipped with a mechanical stirrer, a 125 ml. pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed. 1-(t-Butyldimethylsilylthio)-3-chloro-propane, 60.22 grams (0.268 mole, 1.00 equivalent) is added dropwise. An exotherm is detected after 21.8% of the feed has been added. A dry ice/hexane cooling bath is applied to maintain the reaction temperature at 60–65° C. The total feed time is one hundred minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Isoprene, 36.45 grams (0.535 mole, 2.00 equivalents) is then added dropwise. An exotherm is noted after 24.6% of the feed has been added. Hexane cooling is applied to maintain the reaction temperature at 60–65° C. The total isoprene feed time is thirty eight minutes. The reaction mixture is allowed to stir at room temperature for one hour, then transferred to a small pressure filter with argon pressure. Very rapid filtration is achieved with 2 psi argon. The muds are reslurried with cyclohexane (2×50 ml). This affords an orange solution;

yield=530 ml, 435.21 grams.

Total base=17.7 wt. %.

Active C—Li=16.9 wt %.

Yield (based on active C—Li)=82.4%.

EXAMPLE C
Preparation of 3-(N,N-Dimethylamino)-1-propyllithium Chain Extended with 2 Moles of Isoprene, Lot 9314

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37° C. with a heating mantle. The heat source was removed. 1-Chloro-3-(N,N-dimethylamino)propane, 19.64 grams (0.1615 mole) dissolved in 120 ml. cyclohexane was added dropwise. An exotherm (up to 52° C.) was detected after 7% of the feed had been added. A dry ice/hexane cooling bath was applied to maintain the reaction temperature at 41–44° C. The total feed time was thirty-two minutes. An exotherm was noted until the last drop of feed was added, then the temperature was maintained at 36–40° C. for an additional thirty minutes. The reaction mixture was then transferred to a sintered glass filter while still warm. The filtration was complete in three minutes with three psi argon pressure. This afforded a hazy suspension.

Yield=400 ml., 298.2 grams.

Active C—Li=0.361 M (0.469 m/kg) @ 40° C.

Yield (based on active C—Li=87%.

The product crystallized from solution upon standing at room temperature. The concentration of the clear supernatant solution was about 0.3 M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48–49° C. for forty minutes. This afforded a slightly hazy golden solution, which was partially vacuum-stripped on the rotary evaporator to afford the product solution.

Yield=43.32 grams.

Active C—Li=1.36 M (1.65 m/kg).

Recovered yield (based on active C—Li)=98.5%.

EXAMPLES OF THE INVENTION—PREPARATION OF POLYMERS

EXAMPLE 1
Synthesis of t-butyldimethylsilyloxy functionalized polybutadiene star (Lot PBD4K-2)

A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(t-Butyldimethylsilyloxy)-1-propyllithium in cyclohexane, 7.3×10$^{-3}$ moles (16.52 wt. %, 10 ml.) was added to the reactor with a syringe via the inlet tube. The inlet tube was then flame sealed, and the reactor was re-evacuated. Dry cyclohexane solvent, 292.00 grams (374.84 ml.), and tetrahydrofuran, 2.63 grams (0.0365 mole, 5.00 equivalents, 2.97 ml.) were then distilled directly into the reactor. The flask was then removed from the vacuum line by a flame seal. The reactor was then heated to 30° C., and 29.20 grams (40.56 ml.) of butadiene was added from a break seal ampoule. The reaction mixture was held at 30° C. for twenty-four hours. A 2 ml. aliquot was withdrawn through the sample port, and quenched with methanol. The resultant base polymer was analyzed by SEC. The star polymer was then formed by the addition silicon tetrachloride, 1.83×10$^{-3}$ moles (0.25 equivalents) from a break seal ampoule. The reaction mixture was stirred at 30° C. for nine hours, then quenched with degassed methanol (1.0 ml.) added from the last break seal ampoule. The polymer was recovered by precipitation two times into methanol, and vacuum dried. The resultant functionalized base polymer was characterized by SEC, and had the following properties:

Mn=3350 g/mole

Mw=3640 g/mole

Mw/Mn=1.08

The resultant functionalized star polymer was fully characterized by $^1$H NMR and SEC. The $^1$H NMR spectrum indicated a 1,4:1,2 ratio of 6:4, and exhibited a peak at 0.88 ppm assigned to the t-butyldimethylsilyloxy group.

EXAMPLE 2
Deprotection of t-butyldimethylsilyloxy group from functionalized polybutadiene star (Lot PBD4K-2)

HYPOTHETICAL

A 100 ml., flask is fitted with a magnetic stir bar, a reflux condenser, and a nitrogen inlet. This apparatus is dried in an oven overnight at 125° C., assembled hot, and allowed to cool in a stream of nitrogen. The t-butyldimethylsilyloxy functionalized star polymer, prepared in Example 1, (1.0 gram) and tetrahydrofuran (10 ml) are added to the flask. This is followed by three drops of 1.37 Normal aqueous hydrochloric acid. The reaction mixture is heated to reflux for four hours. The reaction mixture is allowed to cool to room temperature. After solvent removal and vacuum drying, the resultant polymer is analyzed by $^1$H NMR.

The t-butyldimethylsilyloxy group (0.89 ppm) signal is completely absent.

EXAMPLE 3
Synthesis of t-butoxy functionalized polybutadiene star (Lot PBD4K-3)

A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(1,1-Dimethylethoxy)-1-propyllithium (chain extended with two equivalents of isoprene) in cyclohexane, 3×10$^{-3}$ moles (15.8 wt. %, 10 ml.) was added to the reactor with a syringe via the inlet tube. The inlet tube was then flame sealed, and the reactor was re-evacuated. Dry cyclohexane solvent, 120.00 grams (154.04 ml.), and tetrahydrofuran, 1.08 grams (0.015 mole, 5.00 equivalents, 1.22 ml.) were then distilled directly into the reactor. The flask was then removed from the vacuum line by a flame seal. The reactor was then heated to 30° C., and 12.00 grams (16.67 ml.) of butadiene was added from a break seal ampoule. The reaction mixture was held at 30° C. for twenty-four hours. A 2 ml. aliquot was withdrawn through the sample port, and quenched with methanol. The resultant base polymer was analyzed by SEC. The star polymer was then formed by the addition silicon tetrachloride, $7.5 \times 10^{-4}$ moles (0.25 equivalents) from a break seal ampoule. The reaction mixture was stirred at 30° C. for nine hours, then quenched with degassed methanol (1.0 ml.) added from the last break seal ampoule. The polymer was recovered by precipitation two times into methanol, and vacuum dried. The resultant functionalized base polymer was characterized by SEC, and had the following properties:

Mn=26300 g/mole

Mw=2900 g/mole

Mw/Mn=1.10

The resultant functionalized star polymer was fully characterized by $^1$H NMR and SEC. The $^1$H NMR spectrum indicated a 1,4:1,2 ratio of 6:4, and exhibited a peak at 1.17 ppm for the t-butoxy group.

EXAMPLE 4

Deprotection of t-butyoxy group from functionalized polybutadiene star (Lot PBD4K-3)

HYPOTHETICAL

A 100 ml., flask is fitted with a magnetic stir bar, a reflux condenser, and a nitrogen inlet. This apparatus is dried in an oven overnight at 125° C., assembled hot, and allowed to cool in a stream of nitrogen. The t-butoxy functionalized star polymer, prepared in Example 3, (1.00 gram), toluene (10 ml) and Amberlyst® 15 resin (0.50 grams) are added to the flask. The reaction mixture is heated to reflux for thirteen hours. The reaction mixture is allowed to cool to room temperature. The Amberlyst® 15 resin is removed by filtration. After solvent removal and vacuum drying, the resultant polymer is analyzed by $^1$H NMR.

The peak from the t-butoxy group is completely absent (1.17 ppm).

EXAMPLE 5

Synthesis of t-butoxy functionalized polyisoprene star

A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(1,1-Dimethylethoxy)-1-propyllithium (chain extended with 2 moles of isoprene) in cyclohexane, $3 \times 10^{-4}$ moles (0.3M, 1.0 ml.) was added to the reactor with a syringe via the inlet tube. The inlet tube was then flame sealed, and the reactor was re-evacuated. Dry cyclohexane solvent, 90 ml., was then distilled directly into the reactor. The flask was then removed from the vacuum line by a flame seal. The reactor was then heated to 50° C., and 15.6 ml. of isoprene was added from a break seal ampoule The reaction mixture was held at 45–50° C. for twelve hours. A 2 ml. aliquot was withdrawn through the sample port, and quenched with methanol. The resultant base polymer was analyzed by SEC. The temperature was increased to 60° C., then divinylbenzene $9 \times 10^{-4}$ moles (0.24 ml., 3.0 equivalents) was added from a break seal ampoule. The reaction mixture was stirred at 60° C. for nine hours, then quenched with degassed methanol (1.5 ml.) added from the last break seal ampoule.

The polymer was recovered by precipitation two times into methanol, and vauum dried.

The resultant functionalized base polymer was characterized by SEC, and had the following properties:

Mn=33,867 g/mole

Mw/Mn=1.06

The resultant functionalized star polymer was fully characterized by $^1$H NMR and SEC, and had the following properties:

Mn=182,000 g/mole (based on linear polyisoprene standards).

Mw/Mn=1.11

Yield=91.5%

The $^1$H NMR spectrum indicated a 1,4:1,2 ratio of 92:8, and exhibited a peak at 1.15 ppm for the t-butoxy group.

EXAMPLE 6

Hydrogenation of t-butoxy functionalized polyisoprene star

HYPOTHETICAL

The hydrogenation catalyst is preformed by mixing 1.00 gram (8% in pentane) nickel octoate and 0.76 grams of triethylaluminum (25% in cyclohexane) in a small, dry vial. The dry hydrogenation vessel is purged with argon, then charged with the polymer prepared in Example 5, purified cyclohexane, and finally, the catalyst (prepared above). The atmosphere is exchanged with hydrogen gas by pressuring the vessel up to 20 psi, and then releasing the pressure. This is repeated 5 times. The pressure is then increased to 90 psi, and the magnetically stirred solution is then heated to 70° C. The hydrogenation is conducted for twelve hours. The reaction mixture is then allowed to cool to room temperature, and the hydrogen pressure is released. The catalyst is removed by washing the polymer with dilute acid (0.5% hydrochloric acid) three times. The polymer is recovered and dried.

The resultant saturated functionalized star polymer was fully characterized by $^1$H NMR, IR and SEC, and had the following properties:

Mn=184,000 g/mole (based on linear polyisoprene standards).

$^1$H NMR indicates that all the aliphatic unsaturation (4.50–5.20 ppm) is consumed, and that the t-butoxy group is still present (1.15 ppm).

IR indicates all the aliphatic double bond absorptions at 800–900 and 1650–1670 wavenumbers are gone.

EXAMPLE 7

Deprotection of t-butyoxy group from functionalized polyisoprene star

HYPOTHETICAL

A 100 ml., flask is fitted with a magnetic stir bar, a reflux condenser, and a nitrogen inlet. This apparatus is dried in an oven overnight at 125° C., assembled hot, and allowed to cool in a stream of nitrogen. The t-butoxy functionalized star polymer, prepared in Example 5, (1.00 gram), toluene (10 ml) and Amberlyst® 15 resin (0.50 grams) are added to the flask. The reaction mixture is heated to reflux for thirteen hours. The reaction mixture is then allowed to cool to room temperature. The Amberlyst® 15 resin is removed by filtration. After solvent removal and vacuum drying, the resultant polymer is analyzed by $^1$H NMR.

The signal from the t-butoxy group is completely absent (1.15 ppm).

EXAMPLE 8
Synthesis of t-butyldimethylsilyloxy functionalized polyisoprene star A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(t-Butyldimethylsilyl-oxy)-1-propyllithium in cyclohexane, $3.7 \times 10^{-4}$ moles (0.73 M, 0.5 ml.) was added to the reactor with a syringe via the inlet tube. The inlet tube was then flame sealed, and the reactor was re-evacuated. Dry cyclohexane solvent, 90 ml. was then distilled directly into the reactor. The flask was then removed from the vacuum line by a flame seal. The reactor was then heated to 50° C., and 15.0 ml. of isoprene was added from a break seal ampoule. The reaction mixture was held at 55° C. for five hours. A 2 ml. aliquot was withdrawn through the sample port, and quenched with methanol. The resultant base polymer was analyzed by SEC. The temperature was increased to 60° C., then divinylbenzene $1.1 \times 10^{-3}$ moles (0.25 ml., 3.0 equivalents) was added from a break seal ampoule. The reaction mixture was stirred at 60° C. for ten hours, then quenched with degassed methanol (1.5 ml.) added from the last break seal ampoule. The polymer was recovered by precipitation two times into methanol, and vacuum dried.

The resultant functionalized base polymer was characterized by SEC, and had the following properties:

Mn=32267 g/mole
Mw/Mn=1.04

The resultant functionalized star polymer was fully characterized by $^1$H NMR and SEC, and had the following properties:

Mn=195500 g/mole (based on linear polyisoprene standards).
Mw/Mn=1.12
Yield=89.7%

The $^1$H NMR spectrum indicated a 1,4:1,2 ratio of 92:8, and exhibited peaks at 0.88 and 0.05 ppm assigned to the t-butyldimethylsilyloxy group.

EXAMPLE 9
Synthesis of t-butyldimethylsilyloxy functionalized polyisoprene star A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(t-Butyldimethylsilyloxy)-1-propyllithium in cyclohexane, $3.7 \times 10^{-4}$ moles (0.73 M, 0.5 ml.) was added to the reactor with a syringe via the inlet tube. The inlet tube was then flame sealed, and the reactor was re-evacuated. Dry cyclohexane solvent, 90 ml. was then distilled directly into the reactor. The flask was then removed from the vacuum line by a flame seal. The reactor was then heated to 50° C., and 15.0 ml. of isoprene was added from a break seal ampoule. The reaction mixture was held at 25° C. for twelve hours. A 2 ml. aliquot was withdrawn through the sample port, and quenched with methanol. The resultant base polymer was analyzed by SEC. The temperature was increased to 60° C., then divinylbenzene $1.63 \times 10^{-3}$ moles (0.37 ml., 4.4 equivalents) was added from a break seal ampoule. The reaction mixture was stirred at 60° C. for ten hours, then quenched with degassed methanol (1.5 ml.) added from the last break seal ampoule. The polymer was recovered by precipitation two times into methanol, and vacuum dried.

The resultant functionalized base polymer was characterized by SEC, and had the following properties:

Mn=43,000 g/mole
Mw/Mn=1.06

The resultant functionalized star polymer was fully characterized by $^1$H NMR and SEC, and had the following properties:

Mn=244800 g/mole (based on linear polyisoprene standards).
Mw/Mn=1.10
Yield=92.0%

The $^1$H NMR spectrum indicated a 1,4:1,2 ratio of 92:8, and exhibited peaks at 0.88 and 0.05 ppm assigned to the t-butyldimethylsilyloxy group.

EXAMPLE 10
Deprotection of t-butyldimethylsilyloxy group from functionalized polyisoprene star A 100 ml., flask was fitted with a magnetic stir bar, a reflux condenser, and a nitrogen inlet. This apparatus was dried in an oven overnight at 125° C., assembled hot, and allowed to cool in a stream of nitrogen. t-Butyldimethylsilyloxy functionalized star polymer, prepared in Example 7, (1.0 gram) and tetrahydrofuran (10 ml) were added to the flask. This was followed by 5% aqueous hydrochloric acid, until pH=1–2. The reaction mixture was heated to reflux for seven hours. The reaction mixture was allowed to cool to room temperature. After solvent removal and vacuum drying, the resultant polymer was analyzed by $^1$H NMR.

The t-butyldimethylsilyloxy group (0.88 and 0.05 ppm) signals were completely absent.

EXAMPLE 11
Synthesis of dimethylamino functionalized polyisoprene star

HYPOTHETICAL

A glass reactor is equipped with three break-seal reagent ampoules, a sampling port attached with a Teflon stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(Dimethylamino)-1-propyllithium in cyclohexane, $3.7 \times 10^{-4}$ moles is added to the reactor with a syringe via the inlet tube. The inlet tube is then flame sealed, and the reactor is re-evacuated. Dry cyclohexane solvent, 90 ml. is then distilled directly into the reactor. The flask is then removed from the vacuum line by a flame seal. The reactor is then heated to 50° C., and 15.0 ml. of isoprene is added from a break seal ampoule. The reaction mixture is held at 55° C. for five hours. A 2 ml. aliquot is withdrawn through the sample port, and quenched with methanol. The resultant base polymer is analyzed by SEC. The temperature is increased to 60° C., then divinylbenzene $1.1 \times 10^{-3}$ moles (0.25 ml., 3.0 equivalents) is added from a break seal ampoule. The reaction mixture is stirred at 60° C. for ten hours, then degassed methanol (1.5 ml.) is added from the last break seal ampoule. The polymer is recovered by precipitation two times into methanol, and vacuum dried.

The resultant functionalized base polymer is characterized by SEC, and had the following properties:

Mn=32267 g/mole

Mw/Mn=1.04

The resultant functionalized star polymer was fully characterized by $^1$H NMR and SEC, and had the following properties:

Mn=195500 g/mole (based on linear polyisoprene standards).

Mw/Mn=1.12

Yield=89.7%

The $^1$H NMR spectrum indicated a 1,4:1,2 ratio of 92:8, and a exhibited peak at 2.20 ppm assigned to the dimethylamino group.

What is claimed is:

1. A functionalized telechelic star polymer produced by a process comprising the steps of:
   (a) polymerizing a monomer selected from the group consisting of one or more conjugated diene hydrocarbons, one or more alkenylaromatic compounds, and mixtures of one or more conjugated dienes with one or more alkenylaromatic compounds, in a liquid reaction medium, at a temperature of −30° C. to 150° C., for a period of at least one hour, with a protected functionalized initiator having the formula $$M\text{-}Q_n\text{-}Z\text{-}T\text{-}(A\text{-}R^1R^2R^3)_m$$

wherein M is lithium, sodium, or potassium; Q is an unsaturated hydrocarbyl group derived by incorporation of one or more conjugated diene hydrocarbons, one or more alkenylaromatic compounds, or mixtures of one or more dienes with one or more alkenylaromatic compounds into the M-Z linkage; Z is a branched or straight chain hydrocarbon connecting group which contains 3–25 carbon atoms; T is oxygen, sulfur, or nitrogen; $(A\text{-}R^1R^2R^3)_m$ is a protecting group in which A is an element selected from Group IVa of the Periodic Table of the Elements and $R^1$, $R^2$, and $R^3$ are independently selected from the group consisting of hydrogen, alkyl, substituted alkyl containing lower alkyl, lower alkylthio, and lower dialkylamino, aryl, substituted aryl containing lower alkyl, lower alkylthio, and lower dialkylamino, cycloalkyl and substituted cycloalkyl containing 5 to 12 carbon atoms; n is an integer from 0 to 5; and m is 1 when T is oxygen or sulfur, and m is 2 when T is nitrogen, to produce living polymer anions;
   (b) reacting the living polymer anions with a compound selected from the group consisting of difunctional compounds, polyfunctional compounds and mixtures of these compounds at a temperature of 20° C. to 135° C., for a period of at least one hour, to produce multi-arm star polymers;
   (c) removing the protecting group to produce functionalized telechelic star polymers with oxygen, sulfur or nitrogen groups on the end of each arm of the star polymers;
   (d) reacting the functional groups on the ends of the arms of the polymer with one or more comonomers selected from the group consisting of organic dicarboxylic acids, organic polycarboxylic acids, organic diisocyanates, organic polyisocyanates, organic diamids, organic polyamids, organic polyols, to form polymer blocks as the outer segments of the star polymer arms; and
   (e) recovering the multi-arm star polymers from the reaction medium.

2. The product of claim 1 further comprising hydrogenating the multi-arm star polymers at a temperature between 25 and 150° C. after forming the the multi-arm star polymer and prior to removing the protecing groups to produce a functionalized telechelic star polymer with protected functional groups on the arms of the polymer.

3. The product of claim 1 further comprising hydrogenating the multi-arm star polymers after deprotection of the polymer at a temperature between 25 and 150° C. to produce a saturated, functionalized telechelic star polymer with functional groups on the arms of the polymer.

4. The product of claim 2 wherein the hydrogenation is continued until at least 90% of the aliphatic unsaturation has been saturated.

5. The product of claim 3 wherein the hydrogenation is continued until at least 90% of the aliphatic unsaturation has been saturated.

6. The product of claim 2 wherein the hydrogenation is continued until at least 95% of the aliphatic unsaturation has been saturated.

7. The product of claim 3 wherein the hydrogenation is continued until at least 95% of the aliphatic unsaturation has been saturated.

8. The product of claim 1 wherein the element from Group IVa is selected from carbon and silicon.

9. The polymer of claim 1 wherein the difunctional and poly functional compounds are selected from the group consisting of chlorosilanes, chlorostannanes, isomeric divinylbenzenes, isomeric diisopropenylbenzenes, isomeric trivinylbenzenes, isomeric divinylnaphthalenes and isomeric trivinylnaphthalenes.

10. The product of claim 1, wherein T is oxygen and wherein the protecting groups at the terminus of each arm are removed by acidic deprotection.

11. The product of claim 10, wherein the hydroxyl functional groups are further reacted with diisocyanates and diols to produce polyurethane blocks as the outer segments of the star polymer arms.

12. The product of claim 11, wherein part of the diol is substituted with an acid functional diol, and such acid groups are further neutralized with tertiary amines to provide dispersibility in water.

13. The product of claim 12 wherein the acid functional diol is dimethylolpropionic acid.

14. The product of claim 10, wherein the hydroxyl functional groups are further reacted with a compound selected from diacids, anhydrides, diamines and lactams to produce polyamide blocks as the outer segments of the star polymer arms.

15. The product of claim 10, wherein the hydroxyl functional groups are further reacted with one or more compounds selected from the group consisting of diacids, anhydrides, diols and polyols to produce polyester blocks as the outer segments of the star polymer arms.

16. The product of claim 15, wherein part of the diacid or anhydride is substituted by an unsaturated acid or anhydride which produces unsaturated polyester blocks.

17. The product of claim 16 wherein the unsaturated acid or anhydride is fumaric acid or maleic anhydride.

18. The product of claim 10 wherein the hydroxyl groups are further reacted with an anhydride to form a half-ester with free carboxyl functionality at the terminus of each star polymer arm.

19. The product of claim 18, where the carboxyl functional terminal groups are further reacted with epoxy resins and amine curing agents to form toughened epoxy resin composites.

20. The product of claim 10, wherein the hydroxyl functional groups are reacted with sulfonyl chloride, in the presence of a tertiary amine catalyst, to form sulfonate functional groups at the terminus of each polymer star arm.

21. The product of claim 20 wherein the sulfonate terminated arms of the stars are reacted with primary amines or ammonia, under heat and pressure, to form star polymers with amine functionality at the terminus of each polymer star arm.

22. The product of claim 18, where the carboxyl functional star polymer is reacted with an epoxy resin and an excess of amine to completely react all of the epoxy groups, the excess amine is removed by distillation, and the resulting epoxy-amine adduct is reacted with a water soluble organic or inorganic acid to form water soluble quarternary ammonium containing polymers.

23. The product of claim 2, wherein the protecting groups at the terminus of each arm are removed by acidic deprotection.

24. The product of claim 23, where the hydroxyl functional groups are further reacted with diisocyanates and diols to produce polyurethane blocks as the outer segments of the star polymer arms.

25. The product of claim 24, wherein part of the diol is substituted with an acid functional diol and such acid groups further neutralized with tertiary amines to provide dispersibility in water.

26. The product of claim 25 wherein the acid functional diol is dimethylolpropionic acid.

27. The product of claim 23, wherein the hydroxyl functional groups are further reacted with diacids or anhydrides, and diamines or with lactams to produce polyamide blocks as the outer segments of the star polymer arms.

28. The product of claim 23, where the hydroxyl functional groups are further reacted with diacids or anhydrides and diols or polyols to produce polyester blocks as the outer segments of the star polymer arms.

29. The product of claim 27, wherein part of the diacid or anhydride is substituted by an unsaturated acid or anhydride which produces unsaturated polyester blocks.

30. The product of claim 29 wherein the unsaturated acid or anhydeide is selected from fumaric acid or maleic anhydride.

31. The product of claim 27, wherein the hydroxyl groups are further reacted with an anhydride to form a half-ester with free carboxyl functionality at the terminus of each star polymer arm.

32. The product of claim 31, wherein the carboxyl functional terminal groups are further reacted with epoxy resins and amine curing agents to form toughened epoxy resin composites.

33. The product of claim 23, wherein the hydroxyl functional groups are reacted with sulfonyl chloride, along with a tertiary amine catalyst, to form sulfonate functional groups at the terminus of each polymer star arm.

34. The product of claim 23, wherein the sulfonate terminated arms of the stars are reacted with primary amines or ammonia, under heat and pressure, to form star polymers with amine functionality at the terminus of each polymer star arm.

35. The product of claim 31, wherein the carboxyl functional star polymer is reacted with an epoxy resin and an excess of amine to completely react all of the epoxy groups, the excess amine is removed by distillation, and the resulting epoxy-amine adduct is reacted with a water soluble organic or inorganic acid to form water soluble quarternary ammonium containing polymers.

36. The polymer of claim 1, wherein said monomer is butadiene, M is lithium, Q is isoprene, Z is propyl, T is oxygen, A is carbon, and each $R^1$, $R^2$, and $R^3$ is methyl; and wherein said multi-arm star polymer recovered in paragraph (e) has at least one polyester segment.

37. A functionalized star polymer produced by a process comprising the steps of:

(a) polymerizing a monomer selected from the group consisting of one or more conjugated diene hydrocarbons, one or more alkenylaromatic compounds and mixtures of one or more conjugated dienes with one or more alkenylaromatic compounds in a liquid reaction medium at a temperature of −30° C. to 150° C. for a period of at least one hour with a protected functionalized initiator having a formula

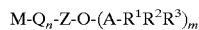

$$M\text{-}Q_n\text{-}Z\text{-}O\text{-}(A\text{-}R^1R^2R^3)_m$$

wherein M is lithium, sodium, or potassium; Q is an unsaturated hydrocarbyl group derived by incorporation of one or more conjugated diene hydrocarbons, one or more alkenylaromatic compounds, or mixtures of one or more dienes with one or more alkenylaromatic compounds; Z is a branched or straight chain hydrocarbon connecting group which contains 3–25 carbon atoms; $(A\text{-}R^1R^2R^3)_m$ is a protecting group in which A is an element selected from Group IVa of the Periodic Table of the Elements and $R^1$, $R^2$, and $R^3$ are independently selected from the group consisting of hydrogen, alkyl, substituted alkyl containing lower alkyl, lower alkylthio, and lower dialkylamino, aryl, substituted aryl containing lower alkyl, lower alkylthio, and lower dialkylamino, cycloalkyl and substituted cycloalkyl containing 5 to 12 carbon atoms; n is an integer from 0 to 5; and m is 1, to produce living polymer anions;

(b) reacting the living polymer anions with a compound selected from the group consisting of difunctional compounds, polyfunctional compounds and mixtures thereof at a temperature of 20° C. to 135° C. for a period of at least one hour to produce multi-arm star polymers;

(c) removing the protecting group to produce functionalized star polymers with oxygen functional groups on the ends of the arms of the star polymer;

(d) reacting the oxygen functional groups on the ends of the arms of the polymer with one or more compounds selected from the group consisting of diacids, anhydrides, diols, and polyols to produce polyester blocks as the outer segments of the star polymer arms; and (e) recovering the multi-arm star polymer from the reaction medium.

38. The polymer of claim 37, wherein said monomer is butadiene, M is lithium, Q is isoprene, Z is propyl, A is carbon, and each $R^1$, $R^2$, and $R^3$ is methyl.

* * * * *

UNITED STATES PATENT AND TRADEMARK OFFICE
CERTIFICATE OF CORRECTION

PATENT NO. : 5,919,870

DATED : July 6, 1999

INVENTOR(S) : Letchford et al.

It is certified that error appears in the above-identified patent and that said Letters Patent is hereby corrected as shown below:

Column 23, line 40, "claim 27" should read --claim 23--.

Signed and Sealed this

Twenty-eighth Day of December, 1999

Attest:

Q. TODD DICKINSON

Attesting Officer  Acting Commissioner of Patents and Trademarks